United States Patent [19]

Shames et al.

[11] Patent Number: 4,662,593
[45] Date of Patent: May 5, 1987

[54] CONCEALED MOUNTING FOR WALL MOUNTED SUPPORTS FORMED OF PLASTIC

[76] Inventors: Sidney J. Shames, 57 Holly Pl., Briarcliff Manor, N.Y. 10510; Harold Shames, 5 Agnes Cir., Ardsley, N.Y. 10502

[21] Appl. No.: 820,183

[22] Filed: Jan. 17, 1986

[51] Int. Cl.⁴ ............................................. F16M 13/00
[52] U.S. Cl. .................. 248/222.1; 248/201; 248/251
[58] Field of Search ............... 248/222.2, 222.1, 223.3, 248/220.2, 224.4, 251, 201, 205.1; 211/105.1; 403/407.1, 406.1

[56] References Cited

U.S. PATENT DOCUMENTS

| | | | |
|---|---|---|---|
| 1,549,433 | 8/1925 | Benjamin | 248/224.4 |
| 1,907,043 | 5/1933 | Crockett | 248/222.1 |
| 1,915,479 | 6/1933 | Smith | 248/222.1 |
| 4,570,887 | 2/1986 | Banister | 248/223.4 |

FOREIGN PATENT DOCUMENTS

| | | | |
|---|---|---|---|
| 820199 | 11/1951 | Fed. Rep. of Germany | 248/220.2 |
| 609113 | 2/1979 | Switzerland | 248/223.4 |

Primary Examiner—Reinaldo P. Machado
Assistant Examiner—Alvin Chin-Shue
Attorney, Agent, or Firm—Norman Lettvin

[57] ABSTRACT

An improved fixture mounting is provided for a cantilevered fixture having a relatively broad base, or rear portion, adapted to be affixed to a support wall or other support surface. The mounting base portion of the fixture is provided with a cavity that is concealed and surrounded by a rearwardly extending wall provided as part of the base of the fixture. Located in the cavity is a first connecting plate having a pair of oppositely positioned flanges that are rearwardly projected, with the first connecting plate and flanges being secured to the fixture that is located forwardly of a support wall that carries thereon a second plate with forwardly projected flanges for support cooperation with the flanges on the first plate, and so that both plates are positioned wholly within the cavity. An adjustable set screw carried on one of the fixture's connecting plate's flanges is arranged and constructed to exert pressure on one of the wall's connecting plate flanges to secure a pressure fit between the connecting plates, and effecting a rigid mounting between the fixture and its associated support wall.

8 Claims, 5 Drawing Figures

CONCEALED MOUNTING FOR WALL MOUNTED SUPPORTS FORMED OF PLASTIC

BACKGROUND OF THE INVENTION

1. Field of the Invention

This invention relates to mountings used to secure cantilevered fixtures to upright walls or other supports. More particularly, this invention relates to inexpensive mountings used to secure a molded plastic cantilevered article support to a support wall.

2. Description of the Prior Art

Bathroom-accessory support fixtures, that are intended to hold or support towels, robes, or personal hygiene articles, have been commercially available for many years. Such fixtures are frequently formed of metal castings, such as exterior-plated zinc, which provides the necessary strength for supporting cantilevered loads coupled with a desired attractive appearance. Such castings usually have their bases secured to the support wall by known fastening means, such as plated screws, while the intrinsic strength of the zinc casting provides the strength needed to withstand the stresses induced within the casting, and onto its mounting, by the application of downward forces of the weight of articles, that are cantilever-supported by being suspended from the extended end of the fixture.

Recent competition from foreign manufacturers, using inexpensive labor, has made it very difficult, if not substantially impossible, for United States manufacturers to compete in the market place, for manufacture and sale of such plated metal fixtures. One attempt to meet such competition has caused some U.S. manufacturers to turn to providing plastic support fixtures, created from injection molded, thin plastic shells, such as disclosed in our co-pending application, Ser. No. 715,745 filed Mar. 25, 1985, abandoned Sept. 2, 1986.

Prior art made known to applicants by citation thereof in said co-pending application include U.S. Pat. Nos. 1,940,888; 2,455,606; 2,492,945; 2,956,767; and 4,498,654.

It has been observed that use of injection-molded, thin-walled, plastic shell mountings for cantilevered bathroom fixtures frequently lack the necessary strength provided by metal castings, particularly when supporting substantial cantilever loads.

While injection-molded, plastic bathroom, fixtures provided with reinforcing means possibly might resolve the strength problem, the invention disclosed herein meets the problem by providing a novel mounting for molded plastic fixtures which are to be cantilever-mounted from a support wall, and which mounting is characterized by simplicity and inexpensiveness of construction, and by effectiveness in usage.

It is, therefore, one object of this invention to provide a new and improved fixture mounting, for molded, thin-walled, plastic fixtures, that are subject to cantilevered forces and stresses, so that a novel combination of features of construction, as disclosed herein, operates to reduce the maximum amount of stress that is developed in the molded plastic fixture element, particularly in the region where the fixture element is secured to its mounting, and essentially eliminates or greatly reduces stress on the mounting section, or terminus, of the fixture that is positioned adjacent the support wall for the fixture, thus permitting greater use of molded plastic fixtures that have reduced intrinsic material strength when compared to molded metal fixtures.

Another disadvantage of support fixtures for bathroom accessories is that they are frequently supported by being secured to the walls of the bathroom by screw means extending directly through the base of the fixture and into the wall, thereby requiring the design of the base of the fixture be interrupted by bores for accommodating screw stems, and having the mounting screw heads exposed. These interruptions in a fixture's base provides recesses that may be difficult to clean, and are less attractive, as is generally known, than a concealed mounting.

Thus, it is an additional object of this invention to provide a new arrangement of a fixture mounting that is substantially concealed, to make the appearance of the mounted fixture more aesthetically pleasing, and to substantially eliminate bores through, and recesses in, the exterior of the fixture's wall that are difficult to clean.

SUMMARY OF THE INVENTION

The objects of this invention are secured by molding an elongated, hollowed, fixture of plastic with a mounting wall, or mounting element therefor, that is located in a plane that lies transverse to the length of the elongated fixture, and is positioned recessed within the elongated fixture, so that said mounting wall will be located spaced outwardly of the wall end of the fixture that is to be positioned adjacent a mounting wall for the fixture, and so as to provide a concealed cavity or chamber in which an inexpensive, but sturdy, mounting for the plastic fixture is located and concealed.

Two interlocking, or meshing, inexpensive metal plates are provided for the sturdy mounting, one of which is adapted to be secured to molded transverse mounting elements of the fixture, and with the other plate constructed and adapted to be secured directly to the structure of the support wall upon which the fixture is to be mounted.

The two metal plates are provided with meshing parts that develop an interlocking and strong support, and the plates are held together by pressure from a selectively adjustable pressuring member, such as a small diameter screw stem that is carried by one plate and arranged to press or clamp against the other plate. Access to the adjustable pressurizing member is obtained, through a small, scarcely noticeable, opening provided in a portion of the skirt of the molded fixture, with the skirt projecting to a location closely adjacent the structural support wall, and serving to substantially surround the concealed cavity, or chamber, in which the metal plates are positioned.

The features of the invention described herein will be more fully understood by reference to the accompanying drawings which illustrate two exemplary forms of the invention.

DETAILED DESCRIPTION OF THE INVENTION

Figure 1:
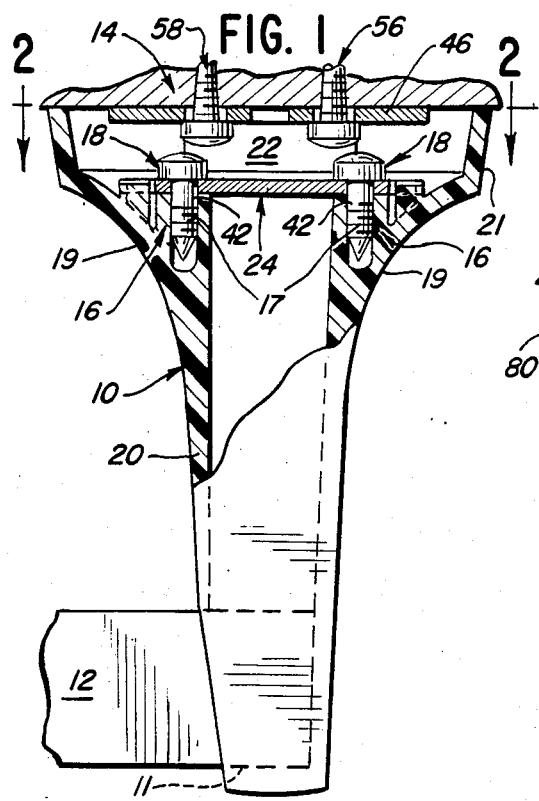
FIG. 1 is a top plan view, with portions broken away, and with portions of the metal mounting plates omitted from this view so as to show a partial interior cross-section of one form of fixture embodying the invention, and said view is taken looking downwardly from a position located above the additional illustrations shown in FIGS. 2 and 3.
Figure 2:
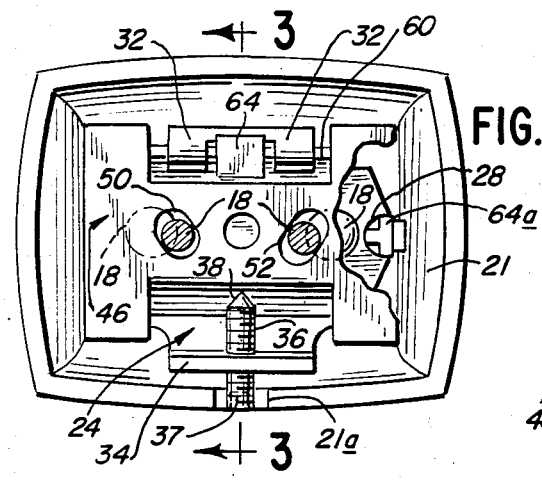
FIG. 2 is a rear elevational view, partly in section, of the form of fixture shown in FIG. 1, and is taken looking in the direction of the arrows shown as part of the section line 2—2 in FIG. 1, and shows in part the interfitting of portions of the two metal mounting plates.
Figure 3:
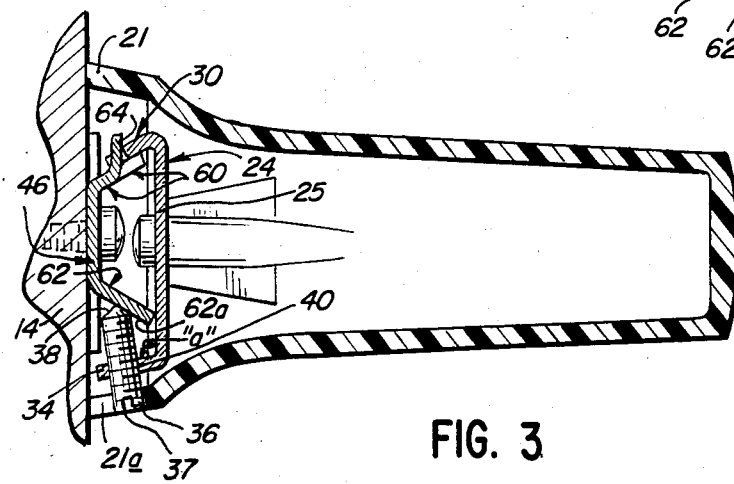
FIG. 3 is a longitudinal cross-sectional view of the fixture and its mounting plates shown in FIGS. 1 and 2, and is taken substantially on section line 3—3 of FIG. 2.

Referring first to FIGS. 1-3, a typical elongated mounting post is generally shown at 10, for holding a structure, such as one end of a towel bar 12 of square, round, or rectangular periphery, shown in fragment in FIG. 1, and with the mounting post arranged to project outwardly from a structural mounting wall which is indicated in fragment at 14. The elongated mounting post 10 is illustrated partially in full plan view, but with portions omitted, or broken away, so as to show a partial crosssectional illustration of the mounting portion thereof. The post 10 is a unitary body that is a molded plastic shell of thin-walled plastic, whose exterior surface is plated to provide a visually attractive body. Because the post is to serve as a support for a towel bar, its projecting end is shown constructed with a recess 11 therein for telescopically receiving thereinto, one end of an elongated, rectangular, round, or square, towel bar 12 that is shaped and constructed as generally disclosed in our said co-pending application, Ser. No. 715,745 filed Mar. 25, 1985. The fixture provides a shell-like exterior wall that extends between proximal and distal ends.

The proximal mounting end of the plastic mounting post 10 that is spaced from towel bar 12 and is proximal the mounting wall for the post, is shown as having an interior portion of the post that is molded with a pair of adjacent but oppositely disposed integral wall enlargements 16 that are rigidly connected to the interior of the body shell and are thickened and strengthened to accept self-tapping screws 18 which will form female threads that receive and cooperate with the threaded stems 17 of mounting screws 18. The heads of screws 18 may be appropriately shaped or recessed, such as being slot-headed or Philipps' headed, to provide means for selective manual connection of each screw 18 to the post 10.

In the region of the thickened portions 16, the exterior of the molded post, of shell construction, is shaped to curve at 19, gradually and gracefully outwardly and away from the longitudinal hollow stem 20 of the post 10, in the rearwardly extending direction, and to merge with a relatively short length of the post's shell to provide a truncated, pyramidal-shaped, shell-like, peripheral skirt 21 that is not load bearing but surrounds and conceals a chamber 22 when the post 10 is mounted upon an adjacent structural mounting wall 14, provided in a dwelling or the like. Shell skirt 21 has a very small opening 21a therein in one of its walls, preferably the lower wall of the post 10, as seen in FIG. 3, when it is mounted on support wall 14.

The two mounting screws 18 are employed to secure, to the molded plastic post 10, a stamped and formed first sheet metal plate 24, formed preferably of an inexpensive, bendable and formable sheet metal, such as inexpensive steel plate. The first metal plate 24 may be constructed of a shape and size for use with the construction of FIGS. 1-3, or may be of a more universal form permitting its use not only with the construction of FIGS. 1-3, but also for use with the form of shell-like construction shown in FIG. 4.

Figure 4:
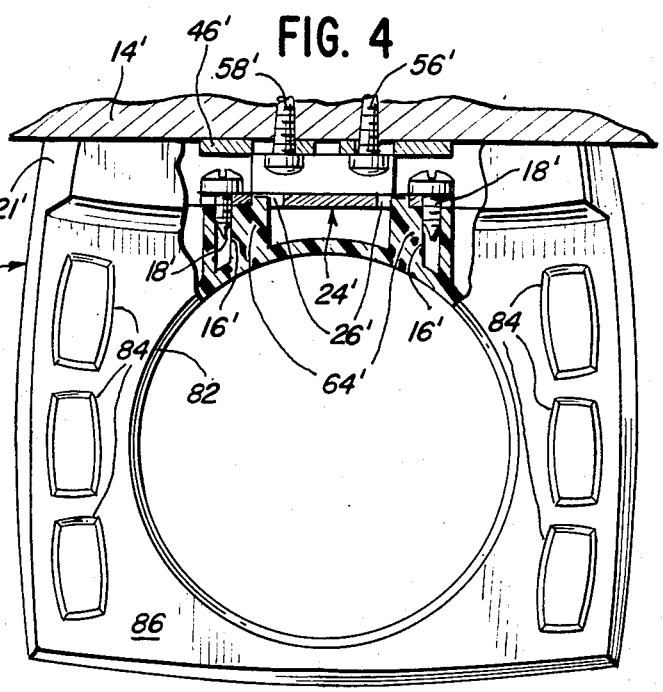
FIG. 4 is a top plan view of a second type of fixture utilizing variants of features of the invention shown in FIGS. 1-3, and illustrates features of a fixture that has elements thereof also illustrated in FIG. 5, but with the meshing mounting plate elements of FIGS. 1-3 being of the type shown in FIGS. 4 and 5.
Figure 5:
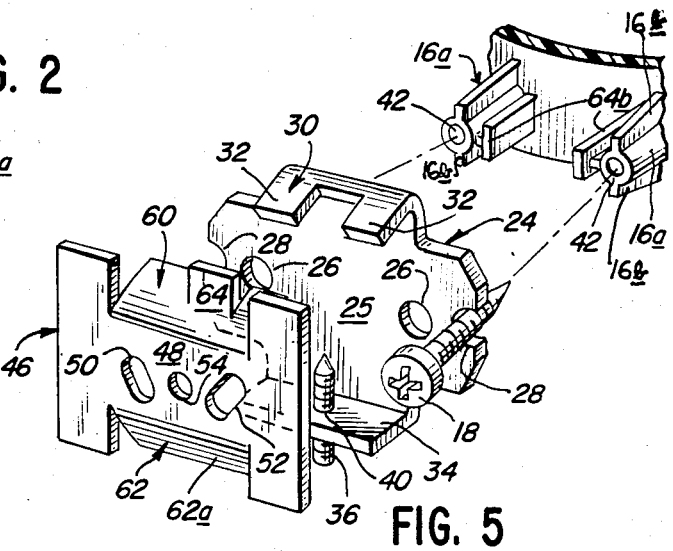
FIG. 5 is a fragmentary, exploded, rear perspective view of a segment of the second type of fixture as seen in FIG. 4, and illustrates the two metal plates with elements thereon for intermeshing, and showing an alternative mounting arrangement for the one plate that is to attach directly to the molded plastic fixture that is to project in cantilevered manner outwardly relative to the mounting wall for the plastic fixture.

Details of plate 24 are seen in each of FIGS. 1-5. Plate 24 has a flat, central, plate section 25 with two laterally spaced, full circumference holes 26 punched therethrough. Spaced laterally outwardly of the two holes 26 are two approximately semi-circular holes 28, which also have been punched out through the plate 24, but opening laterally through the lateral edges of the plate's flat central portion, so that holes 28 are approximately semi-circular, as best seen in FIGS. 2 and 5.

Opposite edges of said first plate 24, other than the two opposite lateral edges, each with a hole 28 therein, extend outwardly of central plate section 25 and are bent from the plane of the plate's central portion 25 to form rearwardly extending flanges 30 and 34. The flange 30 is an upper, rearwardly extending, flange that has been formed, by stamping, to provide a bifurcated, flange shape extending transversely of plate section 25 and rearwardly thereof, with a pair of laterally spaced teeth, or segments 32, serving as part of flange 30, and being provided by and during the stamping or forming operation. The section of plate 24 that is opposite to upper flange 30 has a lower flange 34 bent rearwardly from the first plate's central portion 25, so as to lie transversely to the first plate's central portion 25. Lower flange 34 forms with the central portion 25 of plate 24 an included angle "a" that, as best seen in FIG. 3, is greater than 90 degrees, in an amount as required to provide for proper function of the clamping screw stem that is hereinafter described.

An elongated, pressurizing, threaded clamping screw 36 with an elongated stem and a conically tapered tip 38 is carried by lower flange 34 and is positioned centrally between the lateral edges of flange 34, and so that the conical tip 38 of screw 36 is located spaced rearwardly further from the plane of plate 24's central portion 25 than is the shank portion of screw 36 that is held in the threaded bore 40 of flange 34.

The two mounting screws 18, in the form of assembly shown in FIGS. 1-3, have their stems extend respectively through holes 26 in plate 24, and said screw stems are each screwed into a hole 42 provided in thickened molded plastic portions 16 so that the heads of screws 18 operate to hold, or clamp, plate 24 tightly against the post 10, and serving in the final assembly to locate the plate 24 in the concealed chamber 22 and spaced from the opposite mounting wall 14 to which the post is to attach.

Secured to wall 14 is a stamped and formed, inexpensive, second sheet metal, rear plate 46, that is located in chamber 22 and is formed preferably of inexpensive steel, and whose rear elevational shape is best seen in FIGS. 2, 3 and 5. FIG. 2 shows a rear elevational view of rear plate 46. FIG. 5 shows the rear plate 46 in perspective. FIG. 3 shows rear plate 46 in edge elevation.

This second plate 46 serves as a mounting, to which the post 10, through its attaching plate 24, is to connect.

Second plate 46 has a flat, central, portion 48 with three holes 50, 52, and 54 punched therethrough. Holes 50 and 52 are elongated diagonally, and extend downwardly and converging, as seen in FIG. 5. A pair of headed screws 56 and 58, seen in FIG. 1, are employed to screw into wall 14 to clamp the central flat portion 48 of second plate 46 against the flat exposed surface of mounting wall 14.

The central flat portion 48 of plate 46 has upper and lower flanges, respectively 60 and 62, bent forwardly of central flat portion 48 so as to extend forwardly away from wall 14, each at an angle of about sixty degrees to the plane of flat portion 48, as shown. The upper flange 60 has a central tab 64 stamped and bent upwardly from the flange 60, so that tab 64 extends substantially vertically upwardly, as seen in FIGS. 3 and 5, and being positioned to enter between, and intermesh with, the opposed lateral edges of the pair of teeth 32 formed on the first plate 24.

As best seen in FIG. 3, the intermeshing of plate 24 and plate 46 provides that the spaced teeth 32 of plate 24 overlie a portion of flange 60 of the second plate 46, to provide an abutment therebetween whereby wall mounted plate 46, supports plate 24 and its attached post 10, thereby limiting downward movement of plate 24 and post 10 relative to wall-mounted plate 46. The central tab 64 located between teeth 32 limits any substantial lateral movement of front plate 24 relative to rear plate 46. When assembled, as seen in FIG. 3, the central planar portion 25 of the first plate 24 is parallel to the central planar portion 48 of the second plate 46.

When the parts are properly assembled as shown in FIGS. 2 and 3, the lower flange 62 of plate 46 is, as seen in FIG. 3, spaced above lower flange 34 of plate 24, with flange 34 providing an inclined under surface 62a on flange 62 extending from wall 14 forwardly and downwardly and positioned to be slidably engaged by the tapered tip 38 of clamp screw 36, so that when a force is applied by screw 36 against flange 62a, the contact will operate to jam flanges 60 and 30 of plates 46 and 24 together to hold post 10 firmly in position on plate 46, which, in turn, is attached to structural support wall 14. The end of clamp screw 36 opposite tip 38 thereof is provided with a slot 37 diametrically thereacross for receiving the tip of a screw driver therein, so that the clamp screw 36 may be selectively advanced or withdrawn using a screwdriver's tip cooperating within slot 37.

The interengaging flanges on plates 24 and 46 are located in the chamber 22. The interior of chamber 22 is concealed by the rearmost, flared, flange 21 of post 10. The small opening 21a is preferably positioned in the lower wall of flange 20 to provide access to the outermost end of clamp screw 36, while the location in the lower wall of flange 21 serves to generally conceal screw 36 and opening 21a from view.

The thickened portion 16 of post 10 is so molded that, laterally adjacent each threaded opening 42, there is provided a projecting, aligning, stud. One such projection stud 64a, of a T-shaped cross-section, and located laterally outwardly of an adjacent opening that receives an attachment screw 18, is shown in end elevation, on the right-hand side in FIG. 2, as entering open-sided hole 28, while the attachment screws 18 have their stems extending through plate holes 26 for screw-connecting into tapped holes in wall enlargements 16 of the mounting post 10. A similar arrangement (not shown in FIG. 2) is provided in mirror-image fashion on the opposite edge of central plate section 25 with a projection stud of T-shaped cross-section entering the other open-sided hole 28.

An alternate arrangement using projecting studs 64b is shown in FIG. 5 where the two centering studs 64b are aligned to enter the pair of full holes 26, while screws 18 have their stems pass through partial holes 28, with the threaded stems of screws 18 entering tapped holes 42 provided in thickened, molded, plastic portions 16a that are reinforced by elongated ribs 16b, as shown.

The T-shaped centering studs 64a (seen in FIG. 2), or 64b (seen in FIG. 5), are molded integrally with the adjacent screw-receiving tapped, or molded, sockets 42 to provide for engagement of each pair of adjacent parts.

The studs 64a of FIG. 2, or 64b of FIG. 5, are molded integral with a part of an adjacent thickened portion 16 and are of a length that is long enough to have studs 64a of FIG. 2 or 64b of FIG. 5 to enter full or partial openings provided on plate 24, and help to telescope with and align plate 24 with the structures of the plastic fixture that are to be cooperated with by the arrangement of parts described, and to assure that the first metal plate 24 will be at all times properly aligned on the fixture to which plate 24 attaches.

The use of diagonally elongated openings 50 and 52, arranged in mirror-image relation to each other, and of the central hole 54 in the wall-mounted plate 46, provides flexibility for a "do-it-yourself" installer who is making an installation of attaching the wall-mounted plate 46 to a support wall 14. A template may be provided for the installer of plate 46. Alternatively, one screw 56 or 58 could be inserted through the central hole 54 and into the wall 14 at the desired elevation, and then levelling may be effected by horizontally aligning the position of the second screw along the inclined length of one of the two inclined elongated holes 50 or 52, by pivoting of plate 46 about the axis of the first connected screw through plate 46. After leveling, another an attachment screw could be inserted through the other inclined hole, if desired. Alternatively, levelling can be accomplished by the "do-it-yourself" installer using a screw in one of the two elongated and inclined slots 50 and 52, and then adjustment is effected in leveling of plate 46 by manipulation as needed, and then the second clamping screw could be inserted through the other inclined hole, so that the plate 46 will then be held both at its desired level and in a horizontal postion.

In the construction shown in FIGS. 4 and 5, the device there shown is not a post as shown in FIGS. 1–3, but is a cantilevered toilet accessory member 80 shaped to serve as a combination tumbler and toothbrush holder. The construction of FIG. 4 is intended to use the same principles of the invention as disclosed above relating to FIGS. 1–3 and 5, but with some minor differences.

In FIG. 4, the mounting wall is at 14′. The fixture 80 in FIG. 4 projects outwardly of wall 14′ in cantilevered manner, and is shaped to provide a downwardly tapered circular sleeve 82 for holding a tumbler, or glass, positioned therein. The fixture 80 is molded of plastic and formed to provide a plurality of six openings 84 through which the handles of toothbrushes may be projected with brush heads overlying and supported on upper deck 86 of fixture 80.

A portion of deck 86 is shown broken away in FIG. 4 to disclose the construction used for mounting fixture 80. A second mounting plate, 46', is provided held to the wall 14' by a pair of mounting screws, 56' and 58'. The mounting structure for the device of FIG. 4 is substantially the same as disclosed hereinabove with respect to FIGS. 1-3 and 5. The first mounting plate 24' is constructed to receive a pair of mounting screws 18' for holding the first mounting plate 24' against the molded structure of posts 16' and studs 64b, as seen in FIG. 5, and as described above in connection with the structure shown in FIGS. 1-3.

The bathroom fixture in FIG. 4, is molded with a pair of laterally spaced, thickened, molded and strengthened portions 16' that are laterally set apart a greater distance, than the spacing of enlarged molded portions 16 shown in FIGS. 1-3. The enlarged portions 16' of FIG. 4 merge with a circular molded sleeve-like wall 82 that borders the aperture for receiving thereinto a drinking glass, or the like.

Because the lateral width of fixture 80 in FIG. 4 is greater than the lateral width of fixture 10 in FIGS. 1-3, the first mounting plate 24' that attaches to the strengthened portions 16' of fixture 80, shown in FIG. 4, preferably uses the segmented holes 28 of plate 24 for receiving therethough the threaded stems of attachment screws 18', with the screws 18' being threaded into molded sockets provided in enlarged portions 16' that are spaced apart laterally a greater distance than tapped holes 42 shown in FIG. 1. The molded sockets 16' are integrally molded with the arcuate section of sleeve 82 which in turn is part of the molded fixture 80.

For purposes of effecting alignment arrangements between first metal plate 24' and the specific construction of FIG. 4, the elongated molded sockets are each integrally molded with an adjacent, parallel, reinforcing stem 64', which stems are located at a lesser spacing than sockets 16' and are located between the spacing of the pair of sockets 16', as seen in FIGS. 4 and 5, with each socket 16' associated with and adjacent a reinforcing stem 64b as seen in FIG. 5, and with the length of each stem 64b being such as to project into and engage the wall of an adjacent punched-out, through hole 26, as illustrated in FIGS. 4 and 5.

From the foregoing description of two forms of the invention disclosed herein, it will be seen that there has been provided a universal arrangement for cantilever mounting of fixtures 10 and 80, each being molded from plastic. The use of two plates 24 and 46 which intermesh operates to limit the maximum stress on the plastic that will be developed by a cantilevered load applied at the extended end of the molded plastic fixture, by locating the point of attachment of the plastic fixture to a first metal plate, 24 in FIG. 1, and 24' in FIG. 4, that is spaced outwardly from the support member 46 or 46' that is to be attached to a structural wall, and then providing for attachment of that first metal plate to the second metal plate, 46 in FIG. 1 and 46' in FIG. 4, that is supported directly upon the structural wall, 14 in FIG. 1 and 14' in FIG. 4, from which the molded plastic fixture projects outwardly.

By reliance upon the transferring of force between the two metal plates, the maximum stress developed in the molded plastic fixture is reduced from what would be the situation if the plastic fixture were to be attached directly to the structural support wall 14 or 14'. The intermeshing of the parts of the two metal plates permits of easy connection of a plastic fixture with its attached first metal plate, 24 of FIG. 1 or 24' of FIG. 4, to the second metal plate, 46 of FIG. 1 or 46' of FIG. 4, the latter being secured to the structural wall, 14 of FIG. 1 or 14' of FIG. 4, from which the plastic fixture projects. Each plastic fixture is shaped to extend rearwardly to provide a surrounding skirt, 21 in FIG. 1 and 21' in FIG. 4, that provides a concealed arrangement which encloses and shields from view the chamber, or space, 22 in FIG. 1 and 22' in FIG. 4, in which the two metal plates are located and interconnected.

While particular embodiments of this invention have been shown and described, it will be obvious to those skilled in the art that various changes and modifications may be made therein without departing from the spirit and scope of the invention and, therefore, it is intended in the appended claims to cover all such changes and modifications which fall within the true spirit and scope of the invention.

What is claimed is:

1. In an elongated fixture for attachment to an upright, wall support, said fixture having a proximal end adapted to be located proximal to a wall support, and a distal end that will be spaced distally from said wall support to provide a cantilever fixture mounting, for an article to be supported by the fixture distally from the wall support; the improvement comprising, in combination:

the fixture including a unitary exterior body shell, molded of plastic, to provide an exterior shell-like wall, extending between the shell's proximal and distals end and that is molded of a thin-walled plastic;

the fixture including plastic connector means molded integral with said body shell on an inner surface thereof at a region much closer to the proximal end of the fixture than to the distal, load-carrying, cantilevered end thereof, the plastic connector means including a pair of spaced, tapped, elongated sleeves molded integral with the body shell and having rearwardly extending terminal ends that are spaced forwardly of the plane of the wall support and forwardly of the proximal end of the unitary body shell;

a pair of formed metal plates of relatively inexpensive, sheet metal, that are separate from the fixture and are arranged to be located in a space provided between a plane through the rearward terminal ends of said pair of spaced sleeves on the fixture and the wall support end of the fixture;

a first of said metal plates having a planar portion thereof secured to the ends of said pair of spaced sleeves by two screws whose threaded stems extend through the metal plate and secure into said pair of tapped plastic sleeves on the fixture, said first metal plate having opposed spaced flanges extending rearwardly from the planar portion thereof but terminating forwardly of the plane of the wall support;

the second said metal plate having a central portion thereof adapted to be secured to the wall support and having a pair of opposed spaced flanges projecting forwardly of the central portion of the metal plate to engage and cooperate with the pair of spaced, rearwardly extending, flanges of the first metal plate; and an elongated, clamping screw member being carried by a flange of said first metal plate and positioned to be biased against a portion of the second metal plate that projects forwardly of the wall support, so as to frictionally hold the first metal plate, and its attached plastic cantilever fixture, in selected position on the forwardly projecting flanges of the second metal plate whose central portion is adapted to be attached to the wall support.

2. A construction as in claim 1 wherein the second plate has an exterior surface that extends transversely of the wall support when said second plate is attached to said wall support, and against which the clamping screw member is adapted to be selectively biased to effect a frictional holding of the first metal plate and its attached plastic cantilevered fixture, upon said second metal plate.

3. A construction as in claim 1 wherein the planar portion of the first metal plate is constructed to lie spaced from and parallel to the central portion of the second plate that is secured to the wall support.

4. A construction as in claim 1 wherein a portion of the shell-like exterior wall of the fixture that is positioned adjacent the wall support is provided with a relatively small aperture therethrough, to provide access to one end of the clamping screw member, for manipulating said end of the clamping screw member.

5. A construction as in claim 1 wherein the flange means on the first and second metal plates have meshing portions which operate to inhibit both vertical and lateral movement between said two metal plates when the two metal plates are engaged.

6. A construction as in claim 1 wherein the planar portion of the first metal plate has formed therein a first pair and a second pair of laterally spaced openings therethrough; the pair of spaced tapped sleeves on the fixture, being spaced so as to be aligned with a first pair of said pairs of said laterally spaced openings through the first metal plate, whereby screw fasteners may be projected through one pair of said openings in the plate for screw attachment of the fasteners into said tapped sleeves; and each sleeve having formed adjacent thereto, as part of the fixture, a plastic stud located and positioned to enter one of said second pair of openings in the plate to assure that said first metal plate will be at all times properly aligned on the fixture.

7. A construction as in claim 1 wherein the second metal plate includes a pair of elongated inclined holes therethrough, arranged in mirror-image relation to each other and adapted to receive therethrough stems of screws for fastening said second metal plate to the wall support, the said inclined and elongated holes providing means cooperating with the stems of screws extending therethrough for providing means for leveling the second metal plate relative to the wall support to which it is to attach.

8. An elongated fixture as in claim 1 wherein the exterior body shell of plastic is plated on the exterior surface thereof to provide a visually attractive body.

* * * * *